United States Patent Office 3,850,935
Patented Nov. 26, 1974

3,850,935
PROCESS FOR PRODUCING PIPERIDINE DERIVATIVES BY DEGRADING QUATERNARY PIPERIDINIUM SALTS
Masaru Nakao and Kikuo Sasajima, Toyonaka, Isamu Maruyama and Masaharu Takayama, Minoo, Shigenari Katayama, Takarazuka, Keiichi Ono and Izumi Yanagihara, Osaka, Yoshihiro Tanaka, Takarazuka, Junki Katsube, Toyonaka, Shigeho Inaba, Takarazuka, and Hisao Yamamoto, Nishinomiya, Japan, assignors to Sumitomo Chemical Company, Limited, Osaka, Japan
No Drawing. Filed Oct. 3, 1972, Ser. No. 294,512
Claims priority, application Japan, Oct. 16, 1971, 46/81,797, 46/81,798
Int. Cl. C07d 29/06
U.S. Cl. 260—293.52                                     5 Claims

ABSTRACT OF THE DISCLOSURE

Piperidine derivatives useful as medicines are prepared by a novel process comprising degrading a quaternary piperidinium salt.

The process has several advantages over previously known processes.

---

The present invention relates to a novel process for producing piperidine derivatives having useful therapeutic activities. More particularly, the present invention relates to a novel process for producing piperidine derivatives of the formula,

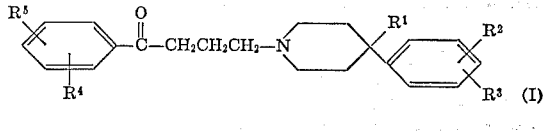

wherein $R^1$ is hydroxy, alkyl having up to 4 carbon atoms, alkoxy having up to 4 carbon atoms, alkanoyl having up to 5 carbon atoms, alkanoyloxy having up to 5 carbon atoms, carboxy, alkoxycarbonyl having up to 5 carbon atoms, carbamoyl, N-($C_1$–$C_3$ alkyl)carbamoyl, N-di($C_1$–$C_3$ alkyl)-carbamoyl, N-($C_1$–$C_4$ alkanoyl)aminomethyl or N-($C_1$–$C_4$ alkoxycarbonyl)aminomethyl; $R^2$ and $R^3$ are respectively hydrogen, hydroxy, alkyl having up to 4 carbon atoms, alkoxy having up to 4 carbon atoms, halogen or trifluoromethyl; $R^4$ is hydrogen, halogen, nitro or ($C_1$–$C_4$)-alkanoylamino; and $R^5$ is halogen (e.g. fluorine, chlorine, bromine or iodine).

The compounds of the present invention are useful as tranquilizers, analgesics or the like, and methods for the production thereof are known in the literatures (British Pats. 881,893 and 1,141,664). A typical conventional method, however, comprising heating an N-unsubstituted piperidine with a 3-benzoylpropyl halide has several disadvantages including poor yields of the product.

It has now been found that the piperidine compounds may readily be prepared by a novel and advantageous process.

Accordingly, the purpose of the present invention is to provide an improved process for producing the above-specified piperidine compounds advantageously.

The process within the invention allows of manufacturing such compounds economically in a high yield and hence is advantageous from the commercial point of view.

In order to attain the above-mentioned object, the present invention provides a process for producing the piperidine compounds given and defined above which comprises degrading a quaternary piperidinium salt of the formula,

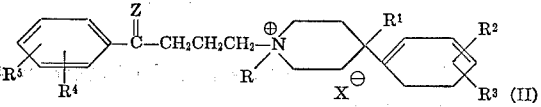

wherein R is an alkyl or aralkyl selected from the group consisting of methyl, ethyl, isopropyl, isobutyl, benzyl, naphthylmethyl, phenethyl and naphthylethyl, the phenyl and naphthyl groups may be optionally substituted by lower ($C_1$–$C_4$) alkyl, lower ($C_1$–$C_4$ alkoxy, nitro or halogen; X is halogen; Z is oxygen or ethylenedioxy; and $R^1$, $R^2$, $R^3$, $R^4$ and $R^5$ are as defined above, and in case where Z is ethylenedioxy, hydrolyzing the resulting ketal compound of the formula,

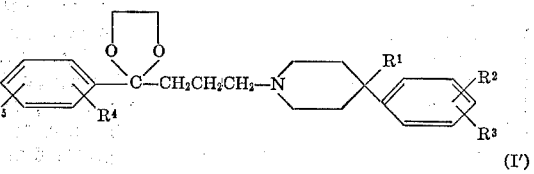

wherein $R^1$, $R^2$, $R^3$, $R^4$ and $R^5$ are as defined above, to regenerate the carbonyl function.

The degradation of the piperidinium salt, the reaction of the present process, is preferably carried out in the presence of a suitable organic or aqueous solvent and more preferably in the presence of a basic agent.

The preferred reaction solvents include water, alcohols, hydrocarbons, halogenated hydrocarbons, ethers, esters, dimethylformamide, glycols and the like. The preferred basic agents include alkali metal hydroxides such as sodium hydroxide, alkali metal hydrides such as sodium hydride, alkali metal alkoxides such as sodium ethoxide and potassium tertiary butoxide, alkali metal phenoxides such as sodium phenoxide, alkali metal thiophenoxides such as sodium thiophenoxide, Grignard's reagents such as methyl magnesium iodide and the like. The reaction is effected at a temperature above 0° C., preferably in the range of from about 40° C. to about 220° C.

It is possible to carry out the reaction under reduced pressure, and there sometimes are obtained more preferable results.

Upon completion of the reaction, the desired product can be isolated by a conventional method and may be purified, if desired, by means of recrystallization.

When the substitutent R is a benzyl, the present invention also provides an alternative procedure for the degradation which comprises hydrogenolyzing the piperidinium salt.

The hydrogenolysis is effected by usual hydrogenation techniques well known in the art, and is conveniently carried out in an alcoholic solvent in the presence of a usual catalyst such as palladium, nickel or the like at about room temperature under about 1 to 4 atmospheres. The reaction is generally completed in a short period of time, usually within one hour and there is obtained the desired product in a good yield.

In case where Z is ethylenedioxy group, the carbonyl function can easily be regenerated by means of hydrolysis. The hydrolysis of the ketal moiety is performed by conventional acidic hydrolysis procedures well known in the art, and is sometimes completed during the course of the degradation procedure without especial means.

Thus, the objective compounds are obtained in a form of free base or an acid addition salt thereof according to the reaction procedures. The salt is converted to the free base in accordance with known methods, and on the other hand, the free base can be converted to a pharmaceutically acceptable acid addition salt thereof in usual manners.

The quaternary piperidinium salt, the starting material of the process, can be easily prepared by reacting a piperidine of the formula,

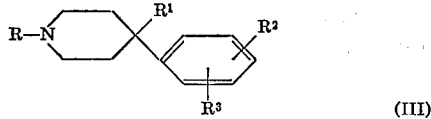

(III)

wherein R, R¹, R² and R³ are as defined above, with a compound of the formula,

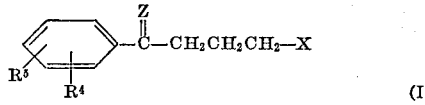

(IV)

wherein R⁴, R⁵, X and Z are as defined above.

The quaternization of the piperidine is carried out by heating in the optional presence of an adequate solvent and/or an inorganic weak base.

The reaction solvent preferably employed is a solvent which is inert under the conditions of the reaction and may be selected from the group consisting of hexane, cyclohexane, benzene, toluene, xylene, nitrobenzene, chlorobenzene, ether, tetrahydrofuran, dioxane, acetone, methyl ethyl ketone, methyl isobutyl ketone, ethyl acetate, isopropanol, carbon tetrachloride, ethylene glycol dimethyl ether and the like.

The reaction is effected at a temperature above room temperature, preferably from about 35° C. to about 200° C. with production of the desired product in high yields. It gives sometimes a good result to carry out the reaction in the presence of an inorganic base such as sodium bicarbonate, potassium carbonate, sodium iodide or the like.

The reaction product may be separated by conventional means and purified or may be used in the crude form in the reaction of the present process.

Benzyl or phenethyl is the substituent represented by the symbol R of choice from the standpoint of economy, although others such as methyl, ethyl, isopropyl, isobutyl, naphtylmethyl, naphtylethyl, p-chlorophenethyl, p-methylphenethyl, p-methoxyphenethyl, p-nitrophenethyl, p-chlorobenzyl and the like may be employed.

The preferred quaternary piperidinium salts include, for example, chloride, bromide and iodide.

According to the present invention the following compounds and acid addition salts thereof are easily obtained:

1-[3-(4-Fluorobenzoyl)propyl]-4-(4-chlorophenyl)-4-hydroxy-piperidine, melting point 150.5°–152° C.

1-[3-(4-Fluorobenzoyl)propyl] - 4-(3,4-dichlorophenyl)-4-hydroxy-piperidine, melting point 135°–137° C.

1-[3-(4-Fluorobenzoyl)propyl]-4-hydroxy-4-(4-methylphenyl)piperidine, melting point 119°–121° C.

1-[3-(4-Fluorobenzoyl)propyl]-4-hydroxy-4-(3-methyl-4-chlorophenyl)piperidine, melting point 123°–124° C.

1-[3-(4-Fluorobenzoyl)propyl] - 4-hydroxy-4-(4-trifluoromethylphenyl)piperidine, melting point (hydrochloride) 209.5°–211° C.

1-[3-(4-Fluorobenzoyl)propyl] - 4-hydroxy - 4-(2-methoxyphenyl)piperidine, melting point (hydrochloride) 237°–238° C.

1-[3-(4-Fluorobenzoyl)propyl]-4-methoxy-4-phenyl-piperidine, melting point 77°–78° C.

1-[3-(4 - Fluorobenzoyl)propyl]-4-acetyloxy-4-(m-trifluoromethylphenyl)piperidine, melting point (hydrobromide) 200° C.

1-[3-(4 - Fluorobenzoyl)propyl]-4-acetyl-4-(3-hydroxyphenyl)piperidine, melting point (hydrochloride) 209°–210° C.

1-[3-(4-Fluorobenzoyl)propyl]-4-(4-chlorophenyl)-4-methylpiperidine, melting point (hydrobromide) 220° C.

1-[3-(4-Fluorobenzoyl)propyl) - 4-(4-chlorophenyl)-4-(ethoxycarbonyl)piperidine, melting point (hydrobromide) 190° C.

1-[3-(4 - Fluorobenzoyl)propyl]-4 - (4-chlorophenyl)-4-(N,N-dimethylcarbamoyl)piperidine, melting point 137°–138° C.

1-[3-(4-Fluorobenzoyl)propyl]-4-(3 - methylphenyl)-4-(pyrrolidinocarbonyl)piperidine, melting point 113°–114° C.

1-[3-(4-Fluorobenzoyl)propyl]-4-(acetaminomethyl)-4-phenylpiperidine, melting point 111°–112° C.

1-[3-(4 - Fluorobenzoyl)propyl] - 4 - (ethoxycarbonylaminoethyl)-4-phenylpiperidine, melting point (hydrochloride) 151°–152° C.

1-[3-(2-Chloro-4-fluorobenzoyl)propyl] - 4 - (4-chlorophenyl)-4-hydroxypiperidine, melting point (hydrochloride) 189° C.

1-[3-(2,4-Difluorobenzoyl)propyl] - 4-(chlorophenyl)-4-hydroxypiperidine, melting point (hydrochloride) 245° C.

1-[3-(2-Chloro - 5 - fluorobenzoyl)propyl]-4-hydroxy-4-phenylpiperidine, melting point (hydrochloride) 200° C.

1-[3-(2 - Bromo - 5-fluorobenzoyl)propyl]-4-hydroxy-4-phenylpiperidine, melting point (hydrochloride) 218° C.

1-[3-(2-Chloro-5-fluorobenzoyl)propyl] - 4 - hydroxy-4-(4-methylphenyl)piperidine, melting point (hydrochloride) 163° C.

1-[3-(2-Acetamino-4-fluorobenzoyl)propyl] - 4 - (4-chlorophenyl) - 4 - hydroxypiperidine, melting point 120°–121° C.

1-[3-(2-Acetamino - 5 - fluorobenzoyl)propyl]-4-hydroxy-4-phenylpiperidine, melting point 121° C.

1-[3-(2-Acetamino - 4 - fluorobenzoyl)propyl]-4-hydroxy-4-(3 - trifluoromethylphenyl)piperidine, melting point 134°–136° C.

The present invention is further illustrated in more detail with reference to the following specific examples.

EXAMPLE 1

Preparation of starting material

A mixture of 0.02 mole of 1-benzyl-4-(4-chlorophenyl)-4-hydroxypiperidine, 0.22 mole of 3-(4-fluorobenzoyl)propyl bromide, 0.4 g. of sodium bicarbonate and 120 ml. of anhydrous acetone was stirred and heated under reflux for 4 hours. The resulting mixture was filtered while still hot, and the filtrate was concentrated to dryness under reduced pressure. The residue was washed with ether to give 1-benzyl - 1 - [3-(4-fluorobenzoyl)propyl] - 4 - (4-chlorophenyl)-4-hydroxypiperidinium bromide melting at 209°–211° C.

Degradation reaction

To a stirred mixture of 5 g. of thiophenol and 15% (W./W.) aqueous sodium hydroxide was added 5 g. of the above-obtained piperidinium salt and the mixture was heated to 85°–90° C. for 2 hours. After cooling, solid matter precipitated was collected by filtration and washed with water to give 1-[3-(4 - fluorobenzoyl)propyl]-4-(4-chlorophenyl) - 4 - hydroxypiperidine. Recrystallization from acetone gave pure product melting at 150°–152° C.

EXAMPLE 2

A mixture of 5 g. of the piperidinium salt obtained in Example 1, 0.5 g. of 5% palladium on charcoal and 160 ml. of 95% ethanol was shaken under a hydrogen atmosphere for 5 minutes at room temperature.

The reaction mixture was filtered and the filtrate was concentrated to dryness under reduced pressure. The residual crystalline solid was washed with ether to give 1-[3-(4 - fluorobenzoyl)propyl] - 4 - (4 - chlorophenyl)-4-hydroxypiperidine hydrobromide melting at 210° C. The free base melting at 150.5°–152° C. was obtained on treating the hydrobromide with diluted aqueous sodium hydroxide. When the procedures of Examples 1 and 2 were followed using 1-(4-chlorobenzyl) - 4 - (4-chlorophenyl)-

4-hydroxypiperidine, 1-(4 - methylbenzyl) - 4 - (4-chlorophenyl)-4-hydroxypiperidine or 1-(4-methoxybenzyl)-4-(4-chlorophenyl)-4-hydroxypiperidine in place of 1-benzyl-4-(4-chlorophenyl) - 4 - hydroxypiperidine, there was obtained successfully 1-[3-(4-fluorobenzoyl)propyl]-4-(4-chlorophenyl)-4-hydroxypiperidine.

EXAMPLE 3

Preparation of starting material

To a solution of 0.015 mole of 1-(2-phenethyl)-4-hydroxy - 4 - (4-methylphenyl)piperidine in 100 ml. of methyl ethyl ketone were added 0.017 mole of 3-(p-fluorobenzoyl)propyl bromide and 0.4 g. of sodium bicarbonate, and the mixture was stirred under reflux for 6 hours.

The resulting mixture was filtered while still hot and the filtrate was concentrated under reduced pressure to a residue.

Degradation reaction

The residual piperidinium salt was added to a solution of 0.7 g. of potassium in 160 ml. of tertiary butanol, and the resulting mixture was stirred and heated at about 80° C. for one hour. After allowing to cool, the reaction mixture was concentrated to a volume of about 40 ml., poured into 100 ml. of water and allowed to stand overnight in a cold place.

The solid mass deposited was collected by filtration, washed with water and recrystallized from aqueous acetone to give 1-[3-(4-fluorobenzoyl)propyl] - 4 - hydroxy-4-(4-methylphenyl)piperidine melting at 119°–121° C.
When the procedure of Example 3 was followed using
1-[2-(4-chlorophenyl)ethyl]-4-hydroxy-4-(3-trifluoromethylphenyl)piperidine,
1-[2-(4-methylphenyl)ethyl]-4-hydroxy-4-(3-trifluoromethylphenyl)piperidine,
1-[2-(4-methoxyphenyl)ethyl]-4-hydroxy-4-(3-trifluoromethylphenyl)piperidine or
1-[2-(4-nitrophenyl)ethyl)-4-hydroxy-4-(3-trifluoromethylphenyl)piperidine in place of 1-(2-phenethyl) - 4 - hydroxy-4-(4-methylphenyl)piperidine, was obtained 1-[3-(4 - fluorobenzoyl)propyl]-4-hydroxy - 4 - (3 - trifluoromethylphenyl)piperidine melting at 99.5°–101° C.

EXAMPLE 4

Preparation of starting material

A mixture of 0.01 mole of 1-benzyl-4-hydroxy-4-(3-trifluoromethylphenyl)piperidine, 0.011 mole of 3,3-ethylenedioxy-3-(4-fluorobenzoyl)propyl chloride, 0.016 mole of sodium iodide and 100 ml. of acetone was stirred and heated under reflux for 6 hours.

The solvent was removed under reduced pressure and the residue was washed with ether and then with water to yield 1-benzyl-1-[3-(4-fluorobenzoyl)-3,3 - ethylenedioxypropyl] - 4 - hydroxy-4-(3-trifluoromethylphenyl)piperidinium iodide as an amorphous solid.

Degradation reaction

A solution of piperidinium salt above-obtained in 200 ml. of 95% ethanol was mixed with 2 g. of 5% palladium on charcoal and hydrogenated at room temperature under normal pressure.

The reaction mixture was filtered, diluted with 100 ml. of water, made basic with 10% aqueous sodium hydroxide and concentrated to about half the volume.

After standing for several hours in a cold place, crystalline solid deposited was collected by filtration and washed with water to give 1-[3-(4-fluorobenzoyl)propyl]-4-hydroxy-4-(3 - trifluoromethylphenyl)piperidine melting at 98°–101° C. The hydrochloride melted at 209.5°–211° C. after recrystallization from isopropanol.

EXAMPLE 5

Preparation of starting material

A solution of 0.01 mole of 1-benzyl-4-hydroxy-4-(3-trifluoromethylphenyl)piperidine and 3-(4-fluorobenzoyl)propyl bromide in 80 ml. of toluene was stirred for 4 hours at about 60° C., during the heating a gummy matter was produced.

After cooling, most of toluene was discarded by decantation and the remaining matter was triturated with ether to yield crystalline 1-benzyl - 1 - [3-(4-fluorozenzoyl)propyl]-4-hydroxy - 4 - (3 - trifluoromethylphenyl)piperidinium bromide melting at 199°–201° C.

Degradation reaction

The piperidinium bromide was hydrogenated by a procedure similar to that in Example 2 to yield 1-[3-(4-fluorobenzoyl)propyl] - 4 - hydroxy - 4 - (3 - trifluoromethylphenyl)piperidine hydrobromide melting at 185°–187° C.

EXAMPLE 6

Preparation of starting material

A mixture of 0.01 mole of 1-methyl-4-hydroxy-4-(3-trifluoromethylphenyl)piperidine, 0.011 mole of 3-(4-fluorobenzoyl)propyl iodide, 0.6 g. of sodium bicarbonate and 60 ml. of acetone was stirred for 3 hours at about 40° C.

The reaction mixture was filtered, and the filtrate was concentrated to dryness under reduced pressure.

The residue was washed with ether to yield 1-[3-(4-fluorobenzoyl)propyl] - 1 - methyl - 4 - hydroxy - 4 - (3-trifluoromethylphenyl)piperidinium iodide as white crystalline powder melting at about 95°–100° C.

Degradation reaction

The piperidinium iodide was added to a mixture of 15 ml. of thiophenol and 60 ml. of 20% (W./W.) aqueous sodium hydroxide, and the resulting mixture was heated to about 90° C. for 2 hours with well stirring. After cooling, the whole was extracted with 200 ml. of ether, and the extract was washed with water and concentrated to a residue. The residue was washed with petroleum ether and recrystallized from hexane containing a small amount of ether to yield 1-[3-(4-fluorobenzoyl)propyl] - 4 - hydroxy - 4 - (3 - trifluoromethylphenyl) piperidine melting at 98°–101° C.

What is claimed is:

1. A process for producing a piperidine compound of the formula,

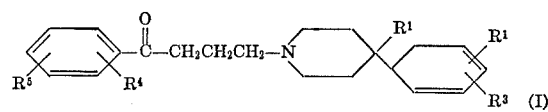

wherein $R^1$ is hydroxy, alkyl having up to 4 carbon atoms, alkoxy having up to 4 carbon atoms, alkanoyl having up to 5 carbon atoms, alkanoyloxy having up to 5 carbon atoms, carboxy, alkoxycarbonyl having up to 5 carbon atoms, carbamoyl, N-($C_1$-$C_3$ alkyl)carbamoyl, N-di ($C_1$-$C_3$ alkyl)carbamoyl, N-($C_1$-$C_4$ alkanoyl)aminomethyl or N-($C_1$-$C_4$ alkoxycarbonyl)aminomethyl; $R^2$ and $R^3$ are respectively hydrogen, hydroxy, alkyl having up to 4 carbon atoms, alkoxy having up to 4 carbon atoms, halogen or trifluoromethyl; $R^4$ is hydrogen, halogen, nitro or ($C_1$-$C_4$)alkanoylamino and $R^5$ is halogen, which comprises degrading a quaternary piperidinium salt of the formula,

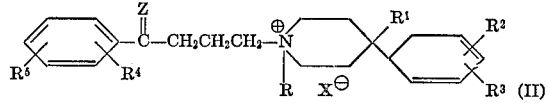

wherein R is benzyl or 2-phenethyl; X is halogen; Z is oxygen or ethylenedioxy; and $R^1$, $R^2$, $R^3$, $R^4$ and $R^5$ are as defined above, and in case where Z is ethylenedioxy, hydrolyzing the resulting ketal compound of the formula,

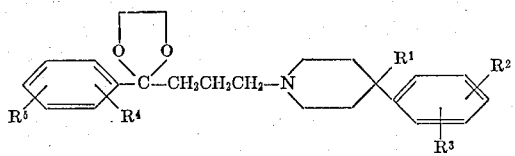

wherein $R^1$, $R^2$, $R^3$, $R^4$ and $R^5$ are as defined above, to regenerate the carbonyl function.

2. A process according to Claim 1 wherein R is benzyl.

3. A process according to Claim 1 wherein R is 2-phenethyl.

4. A process according to Claim 2 wherein the said degradation reaction is conducted by means of catalytic hydrogenation.

5. A process according to Claim 3 wherein the said degradation is carried out in the presence of a strong base.

References Cited

UNITED STATES PATENTS 3,453,313  7/1969  Margot et al. _____ 260—293.8

OTHER REFERENCES

Dissertation Abstracts 27B: 3044-B (1967), Remar.
W. Theilheimer: Synthetic Methods 16: 728 (1962).
Chem. Ber. 90:403-413 (1957), Hunig et al.
C.A. 51: 16472-16473 (1957), Hunig et al.
W. Theilheimer: Synthetic Methods 17: 985 (1963).
Chem. & Ind. 1966: 1759-1760, Wrobel et al.
C.A. 70: 28807n (1969), Horner.
C.A. 74: 140788r (1971), Gegelyan et al.

HENRY R. JILES, Primary Examiner

S. D. WINTERS, Assistant Examiner

U.S. Cl. X.R.

260—293.74, 293.76, 293.8, 293.84, 293.62, 293.67; 424—267